United States Patent Office 3,667,798
Patented June 6, 1972

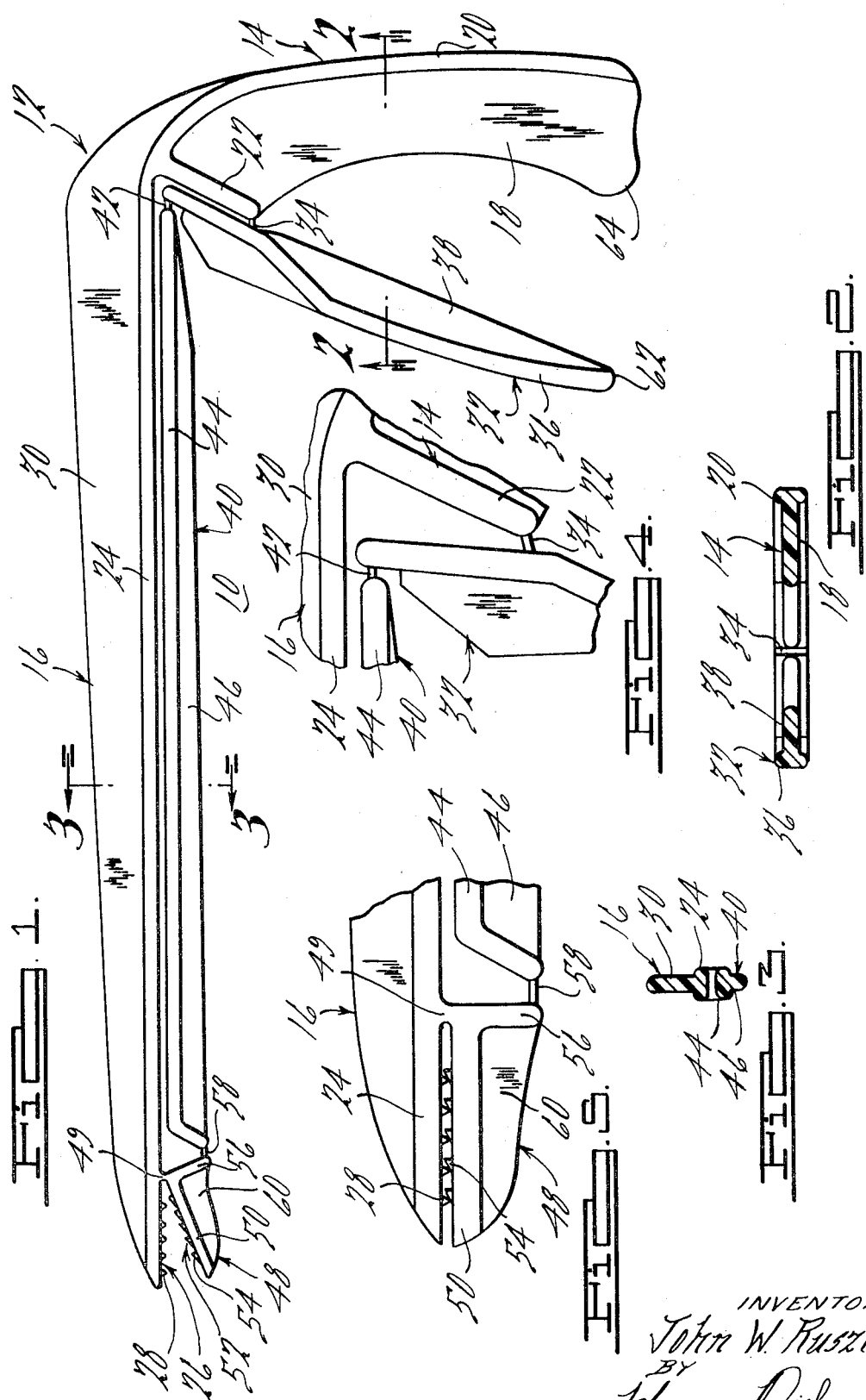

3,667,798
GRIPPING TOOL
John W. Rusztowicz, P.O. Box 116, Utica, Mich. 48087
Filed Feb. 27, 1970, Ser. No. 15,065
Int. Cl. B25b 7/00, 7/12
U.S. Cl. 294—104
3 Claims

ABSTRACT OF THE DISCLOSURE

A gripping tool having a frame including an extending member with a jaw portion at one end and a handle at the other end, a bell crank connected to the extension adjacent the jaw portion having a cooperating jaw portion thereon, an actuating lever pivotally connected to the handle, and a linkage connecting the actuating lever and the bell crank for closing the jaw member. The parts of the gripping tool are integrally formed with resilient pivotal connections to reopen the jaws after each closing therof. The gripping tool is particularly suitable for use as a disgorger of fish hooks and lures.

BACKGROUND OF THE INVENTION

This invention relates to gripping devices, retrieving tools in general and fish hook and lure disgorgers.

SUMMARY OF THE INVENTION

The present invention provides a novel gripping tool and retriever having integrally formed members including a plurality of resilient pivots or hinges between operating members. A gripping tool is provided which is formed in one operation, is fully assembled upon forming, and uses no metallic hinge pins or members which are subject to wear as from relative sliding of the members or corrosion. Additionally, the pivotal connections and hinges of this invention also act to return the parts to their original position so as to be ready for the next actuation of the device without the use of conventional or additional spring members.

More particularly, an exemplary gripping tool of this invention includes a frame having a handle and an extension from the handle carrying one jaw portion at its remote end, an actuating lever pivotally connected to the frame and extending adjacent the handle in a convenient position for actuation by an operator such as by gripping the handle and the lever simultaneously and squeezing so as to bring the lever in closer position relative to the handle. A linkage is also connected to the lever in a location to provide a mechanical advantage. The linkage is connected at its other end to one arm of a bell crank, pivotally connected to the extension adjacent the jaw member, which has a jaw portion on its other arm cooperating with the jaw portion on the extension. A force on the actuating lever is transmitted through the linkage to the bell crank so as to bring the jaw members into gripping engagement.

The gripping tool including the pivotal connections is preferably integrally molded in one operation of a resilient plastic material such as polypropylene to provide pivotal connections or hinges which are resilient such that the jaw member and actuating lever are self-returnable to the open position, ready for the next use.

The gripping tool described herein is particularly suitable for use as a disgorger of hooks and lures from fish since the portion extending from the handle can be of small cross section so as to extend internally of the fish through the mouth thereof to grip the hook or lure and allow an inward application of force which, in practice, has proven to be the preferred method of disgorgment. It can now be particularly appreciated that the non-corrosive nature of the gripping tool provides a significant advantage in its preferred field of use where it will be often in contact with water, at times with salt water, which tends to corrode the metal-containing gripping devices of the prior art. All of the above advantages have been achieved at a cost savings since the integrally molded gripping device of this invention requires no assembly steps, and accordingly, is significantly less expensive to produce than the gripping devices of the prior art.

BRIEF DESCRIPTION OF THE DRAWINGS

FIG. 1 is a side view of an exemplary gripping tool of this invention shown in open-jaws position;

FIG. 2 is a cross-sectional view generally along the line 2—2 of FIG. 1;

FIG. 3 is a cross-sectional view generally along the line 3—3 of FIG. 1;

FIG. 4 is an enlarged detailed view showing the pivotal connection of several members of the gripping tool of this invention shown in the jaws-closed position; and FIG. 5 is an enlarged detailed view of the jaw portion of the gripping tool of FIG. 1 shown in the jaws-closed position.

DETAILED DESCRIPTION OF THE PREFERRED EMBODIMENT

In FIG. 1, gripping tool 10 is illustrated which includes a frame indicated generally at 12 having a handle portion 14 and a main frame member 16 extending from the upper end of the handle 14. The handle 14, generally curved at the right portion thereof to fit the palm of the human hand, has a T-cross section as best seen in FIG. 2 with an enlarged web 18 extending generally in the direction of the extension 16 to provide substantial resistance to bending of the handle in that direction. The handle 14 further has a transverse flange 20 at the right end thereof to provide an adequate degree of lateral rigidity, and for reasons to be made apparent hereinafter. The handle 14 is still further provided with a transverse flange 22 at the upper end thereof which terminates the web 18 and additionally serves as a pivot support.

As can be best seen in FIG. 1, the extending frame member 16 has a transverse flange 24 extending the entire length thereof which blends with the flange 20 of the handle 14 to form a continuation thereof. Near the left or remote end of the flange 24, for example, adjacent as shown, a jaw portion 26 is formed on the lower face thereof having a plurality of triangulated projections 28 providing sharp cross-ridges or teeth. The extension 16 further includes a vertical web 30 extending upwardly from the lateral flange 24 to provide resistance to vertical deflection of the extension 16 in response to upward forces on the jaw portion 26. More particularly, considering an upward force on the jaw portion 26, it will be appreciated that the force creates a bending moment in the vertical plane which increases as the distance to the right increases, i.e. as the moment arm increases. Accordingly, the vertical web 30 increases in vertical dimension in accordance with distance to the right as shown to provide increasing resistance to bending moments in the vertical plane. The vertical web 30 blends into the handle 14 as shown to provide a convenient shape.

The gripping tool 10 is further provided with an actuating lever 32 which is pivotally connected to the handle 14 by a thin integral web of material 34 intermediate the ends of the actuating lever 32. More particularly, the pivotal connection or hinge 34 is located somewhat less than one quarter of the length of the actuating lever 32 from the upper end thereof. To provide resistance to lateral deformation of the actuating lever 32, the actuating lever 32 has a lateral flange 36 which extends along its left portion, i.e. away from the handle 14, from the lower end thereof for a substantial portion of its length. Approximately one third from the upper portion thereof, the lateral flange 36 diagonally traverses the handle 32 so that thereabove the web is located at the right portion of the actuating lever 32, i.e. the portion of the lever 32 nearest the handle 14. As can be seen in FIGS. 1 and 2, the actuating lever 32 further has a web 38 extending the entire length thereof to provide substantial resistance to deflection of the actuating lever 32 in response to the bending moments incurred during actuation of the gripping device 10.

A linkage 40 is pivotally connected to the upper extreme end of the handle 32 by an integral hinge connection 42 at the right end of the linkage 40. The linkage 40 is provided with a lateral flange 44 extending the entire length thereof to provide substantial resistance to lateral deformation and to provide a broad support for hinges at each end thereof. The linkage 40 further has a vertical web 46, forming a T-section with the flange 44, extending the entire length thereof to provide resistance to deflection in the vertical direction.

The gripping device 10 further includes a jaw member 48 in the form of a bell crank, i.e. a member having two arms rigidly connected in a L-like configuration with a pivot at the intersection of the arms. More particularly, the jaw member 48 has a first arm 50 comprising a lateral flange with a jaw portion 52 including triangulated projections 54 forming sharp ridges or teeth thereon and a second arm or lateral flange 56 rigidly connected to and extending generally perpendicularly with respect to the first arm 50. The jaw member 48 is pivotally connected at the intersection of its arms by an integral web or hinge 49 to the main frame member 16 adjacent the right end of the frame member jaw portion 26 so as to provide a cooperating relationship between the jaw portions 26 and 52 as can be best seen in FIG. 5. The jaw member 48 is also pivotally connected at the extreme lower end of its arm 56 to the left end of the linkage 40 by an integral web or hinge 58. A web 60 connects the two arms 50 and 56 to provide substantial resistance to relative angular motion or bending deflection of the arms 50 and 56. Preferably, the projections 54 and 28 on cooperating jaw portions 26 and 52, respectively, are offset such that they at least partially intermesh when the jaws are in the closed position to provide an enhanced gripping effect as also can be best seen in FIG. 5.

It will now be appreciated that the present invention provides several important structural features and advantages. More specifically, the lateral flanges are adapted to intersect at each of the pivotal connections 34, 42, 49 and 58 so as to provide a broad material support for the connections. Preferably the webs of the pivotal connections 34, 42, 49 and 58 extend substantially the entire width of the respective flanges to provide maximum strength and durability. Additionally, the lateral flanges 50 and 24 provide a broad surface or base for the jaw portions 26 and 52 so as to provide a maximum gripping force. Still additionally, the flanges 36 and 20 provide a broad surface engaging the hand of the operator to facilitate convenient and comfortable operation of the gripping device 10. It will be apparent in the following description of the operation of the gripping tool 10 that the webs 18, 30, 38, 46, and 60 are ideally designed to resist forces and bending moments developed during actuation of the device.

In the operation of the gripping device 10, the operator grasps the device 10 such that the handle 14 rests in the palm of the operator's hand and actuating lever 32 is encircled by his fingers. Upon squeezing or compression of the actuating lever 32 with respect to the handle 14, i.e., angular motion thereof toward the handle 14, the upper end of the actuating lever 32 moves toward the left moving the linkage 40 therewith by virtue of the pivotal connection 42 as can be best seen in FIG. 4. Movement of the linkage 40 to the left rotates the bell crank member 48 about the pivot 49 in a clockwise direction so as to bring the jaw portion 52 into engagement with the jaw portion 26 as shown in FIG. 5. Continual compression or force on the lever 32 tending to move it toward the handle 14 provides a mechanically multiplied compressional force transmitted through the linkage 40 by virtue of the leverage advantage attained by the actuating lever 32. The force transmitted through the pivotal connection 58 is converted to an upward force applied on the arm 50 due to inherent operation of the bell crank member 48. The upward force on arm 50 causes forced engagement of the jaw portions 26 and 52 which is sufficient to securely grasp a fish hook, lure or other object of suitable dimension. Breakage of the gripping tool 10 through over-exertion by the operator in operating the actuating lever 32 is prevented by engagement of the lower end portion 62 of the actuating lever 32 with the lower end portion 64 of the handle 14. After release of the force on the actuating lever 32 by the operator, the jaw portions 26 and 52 are self-returnable to the open position due to the unique construction of this device. Specifically, the resilient nature of the pivotal connections 34, 42, 49 and 58 tend to return the members and parts of the gripping device 10 to the original unstressed positions occupied immediately after forming, without need for additional spring members or devices. Accordingly, the gripping tool 10 will be ready for the next actuation thereof.

The gripping tool 10 of this invention is preferably molded in one step of resilient plastic material such as polypropylene using an injection molding machine to form an integral, substantially non-corroding structure having the resilient hinges as above described. It will be appreciated that the structure is complete and ready for operation without assembly steps as required by prior art devices. Accordingly, it is exceedingly simple to manufacture and exceptionally low in cost. Moreover, the gripping tool is not subject to sliding-wear as experienced by devices using pin-type hinges. Thus, the gripping tool of this invention is considered to be an important advance in the art.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. A gripping tool comprising:
   a handle;
   an integral extending member connected to the handle at one of its ends having a jaw portion adjacent the other of its ends;
   an integral actuating lever extending adjacent said handle portion having a pair of ends, said actuating lever being pivotally connected to said handle intermediate said ends by an integral resilient hinge extending between said actuating lever and said handle to provide resilient pivoting therewith;
   an integral bell crank having a first arm with a jaw portion thereon cooperating with said jaw portion on said extending member, and a second arm rigidly connected to said first arm at one of its ends and extending generally perpendicular with respect thereto, said bell crank being pivotally connected to said extending portion adjacent said jaw portion of said extending portion at the connection of said arms by an integral resilient hinge extending between said bell crank and said extending portion to provide resilient pivoting therewith; and
   integral linking member having a pair of ends pivotally connected to one of said ends of said actuating lever at one of its ends by an integral resilient hinge extending between said linking member and said one end of said actuating lever and to the other end of said second arm of said bell crank at its other end by an integral resilient hinge extending between said linking member and said second arm of said bell crank whereby movement of said actuating lever places said linking member in compresison to cause engagement of said jaw portions;

said handle, said extending member, said actuating lever, said bell crank and said linking member being formed of plastic material, and each being generally spaced each from the other and each being generally outside of each other so that said handle, said extending member, said actuating lever, said bell crank, and said linking member being integrally formed by molding.

2. A gripping tool according to claim 1 wherein said plastic material is polypropylene.

3. A gripping tool according to claim 1 wherein each of said handle, said extending member, said actuating lever, said bell crank, and said linking member includes a flange portion and a web portion resisting forces developed during actuation of said tool.

References Cited

UNITED STATES PATENTS

| | | | |
|---|---|---|---|
| 2,836,004 | 5/1958 | Stader | 81—383 |
| 1,379,482 | 5/1921 | Spong | 81—383.5 |

EVON C. BLUNK, Primary Examiner

I. K. SILVERMAN, Assistant Examiner

U.S. Cl. X.R.

81—383, 381